United States Patent
Lorell et al.

(10) Patent No.: US 7,399,096 B1
(45) Date of Patent: Jul. 15, 2008

(54) ENHANCED OPTICAL DELAY LINE WITH MULTIPLE DEGREE OF FREEDOM ACTIVE CONTROL

(75) Inventors: Kenneth Lorell, Los Altos, CA (US); Scott Miller, San Jose, CA (US); Jean-Noel Aubrun, Mountain View, CA (US); Mark Wolfson, San Francisco, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 626 days.

(21) Appl. No.: 11/167,393

(22) Filed: Jun. 28, 2005

Related U.S. Application Data

(60) Provisional application No. 60/663,248, filed on Mar. 21, 2005.

(51) Int. Cl.
*G02B 7/182* (2006.01)
(52) U.S. Cl. .................................... 359/877; 359/202
(58) Field of Classification Search ............... 359/198, 359/201, 202, 850, 855, 857, 871, 872, 877
See application file for complete search history.

(56) References Cited

U.S. PATENT DOCUMENTS

| 4,910,725 A | * | 3/1990 | Drexler et al. | ........... 369/275.1 |
| 6,856,437 B2 | * | 2/2005 | Witt et al. | .................. 359/198 |

* cited by examiner

*Primary Examiner*—Euncha P Cherry
(74) *Attorney, Agent, or Firm*—McDermott Will & Emery LLP

(57) ABSTRACT

An enhanced optical delay line device for providing multiple degree of freedom active control, including first and second actively-controlled mirrors, each of the actively-controlled mirrors having two rotational degrees of freedom and one translational degree of freedom. The first actively-controlled mirror is mounted substantially orthogonally to the second actively-controlled mirror. The system also includes a closed-loop control system, the control system providing six mechanical degrees of freedom of active control for the enhanced optical delay line device by controlling the first and second actively-controlled mirrors based upon a command input and mirror position signals. The present invention is smaller than conventional optical delay line devices, has better performance, and eliminates the need for one of the FSMs, bringing the total number of mechanisms down to two from three.

13 Claims, 13 Drawing Sheets

FIGURE 1 -- PRIOR ART

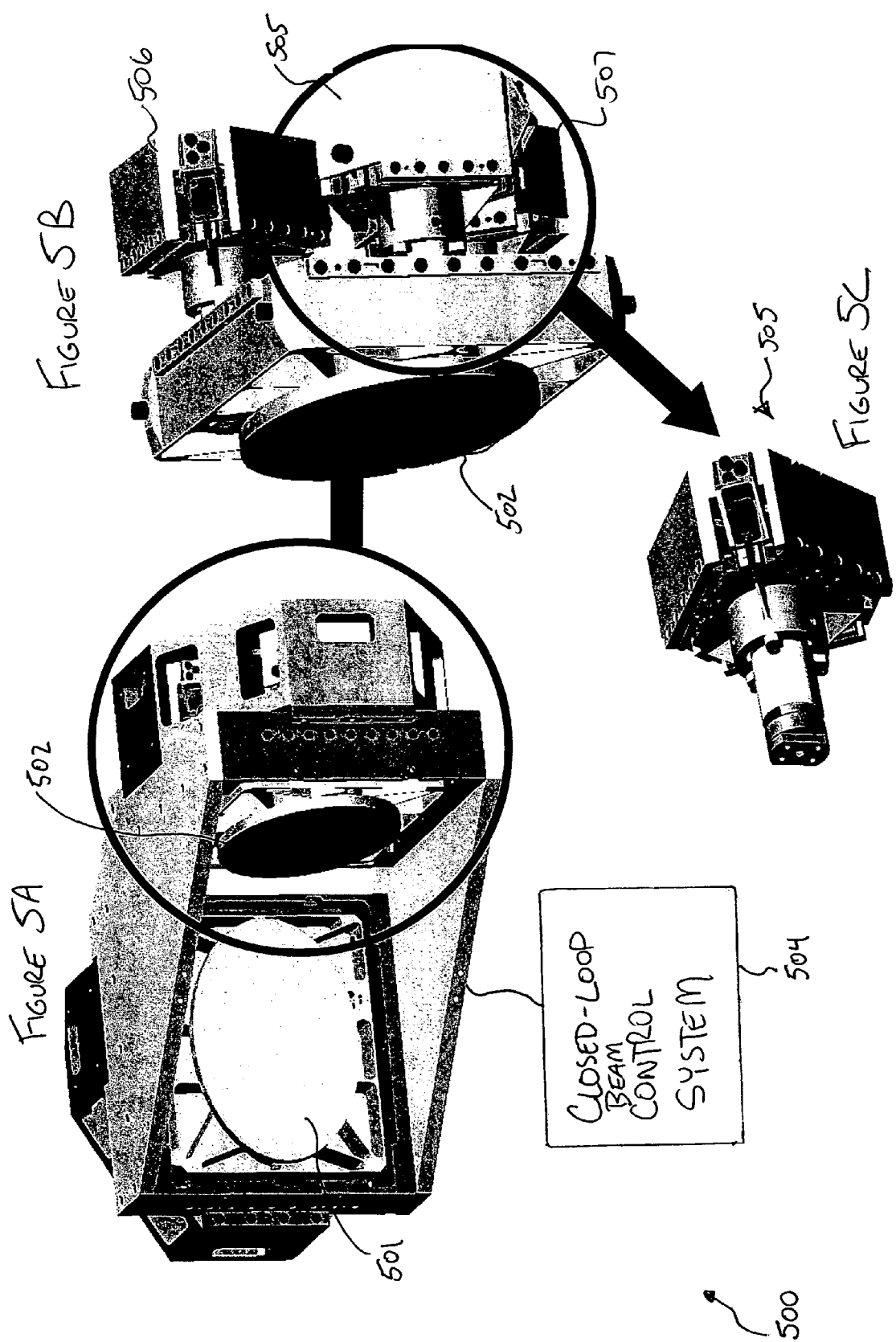

ENHANCED OPTICAL DELAY LINE WITH MULTIPLE DEGREE OF FREEDOM ACTIVE CONTROL

This application claims the benefit of U.S. Provisional Application No. 60/663,248, filed Mar. 21, 2005, which is hereby incorporated by reference.

STATEMENT AS TO RIGHTS TO INVENTIONS MADE UNDER FEDERALLY SPONSORED RESEARCH OR DEVELOPMENT

Not Applicable

FIELD OF THE INVENTION

The present invention generally relates to active optical components and, more particularly, relates to an enhanced pupil positioning and phase control optical system.

DESCRIPTION OF THE RELATED ART

The active optical components used in relay optics section 100 of a multiple telescope array are required to precisely control the position and orientation of the exit pupil of collector telescope 101, as well as the phase of incoming beam 102. As shown in FIGS. 1 and 2, actively-controlled fast steering mirrors ("FSMs") 104 and 105 are employed to provide four degrees of freedom of active control, where FSMs 104 and 105 are combined with conventional optical delay line device 106, which provides two additional actively-controlled degrees of freedom. Fast steering mirrors 104 and 105 typically provide active control of tip/tilt and beamwalk, and conventional optical delay line device 106 typically provides control of pathlength and image rotation.

Together, FSMs 104 and 105 and conventional optical delay line device 106 are capable of controlling the exit pupil position (beamwalk and rotation) and the phase of the incoming beam, so that the phase is identical to that of the other collecting telescopes in the multiple telescope array (tip/tilt and pathlength).

The conventional approach depicted in FIG. 1 has several problems. Initially, three separate active mechanisms (FSMs 104 and 105 and conventional optical delay line device 106) are required to provide six degree of freedom control, where each mechanism adds weight, volume, complexity, power consumption requirements, and cost to the overall relay optics assembly.

Additionally, by using three individual active components, the conventional approach incurs substantial cross-coupling in the beam control system. Specifically, the rotation control provided by conventional optical delay line device 106 also introduces beamwalk, which must then be removed by actuating FSMs 104 and 105, and the tip/tilt control provided by FSMs 104 and 105 introduces beam rotation which the rotation control must remove.

Furthermore, conventional optical delay line device 106 has, in effect, a single translational degree of freedom, and must therefore be very carefully and precisely aligned within the optical train of the relay optical system. As illustrated in FIG. 3, misaligned conventional optical delay line device 301 provides an unacceptably large induced beamwalk 302 and tilt error 304, as the delay line translates along what is essentially the wrong, misaligned path. The degree to which conventional optical delay line device 106 must be accurately aligned presents a very demanding opto-mechanical design and manufacturing problem. As shown in FIG. 4, when you attempt to rotate the beam at angle θ, it induces a beamwalk of ΔX and ΔY, with respect to exit pupil 401.

Moreover, designs for conventional optical delay lines require a bulky form factor that can be very difficult to package in the limited volume available for the relay optics, which are located in the space between collector telescope 101 and combiner telescope 107. An additional negative byproduct of the large size and mass of conventional optical delay line device 106 is that it is quite difficult to achieve the control system bandwidths and degree of reaction force cancellation that are required for high performance optical systems.

The problem of multiple degree of freedom exit pupil and incoming beam phase control has been successfully solved only by utilizing separate optical elements that, while somewhat effective, have important inherent system limitations. Accordingly, it is desirable to provide for active optical components which overcome the deficiencies of conventional components. In particular, it is desirable to provide enhanced pupil positioning and phase control optics which improve performance by reducing noise and increasing bandwidth, while reducing the weight, power, volume, complexity, difficulty of alignment, and relay optics cost in a multiple aperture telescope system.

SUMMARY OF THE INVENTION

The present invention generally relates to active optical components and, more particularly, relates to an enhanced pupil positioning and phase control optical system.

In general, the present invention provides a mechanism, based on FSM and optical delay line technology, that combines the performance characteristics of both FSMs and optical delay lines. The mechanism uses two actively-controlled mirrors mounted at a 90° angle to each other, where each mirror has two rotational (tilt) degrees of freedom and one translational (piston) degree of freedom. When driven by a closed-loop beam control system, the mechanism automatically controls five of the six optical degrees of freedom of the exit pupil and incoming beam phase. Accordingly, the enhanced optical delay line device is smaller than conventional optical delay lines, has better performance, and eliminates the need for one of the two FSMs.

According to one arrangement, the present invention is an enhanced optical delay line device for providing multiple degree of freedom active control, including first and second actively-controlled mirrors, each of the actively-controlled mirrors having two rotational degrees of freedom and one translational degree of freedom. The first actively-controlled mirror is mounted substantially orthogonally to the second actively-controlled mirror. The system also includes a closed-loop control system, the control system providing six mechanical degrees of freedom of active control for the enhanced optical delay line device by controlling the first and second actively-controlled mirrors based upon a command input and mirror position signals.

An improved performance pupil positioning and phase control optical system is provided which simultaneously decreases the weight, power, complexity, volume, difficulty of installation and cost of the system. This is done by combining the functions of the steering mirrors and the optical delay line into a single device that has active mirrors configured to control five of the six optical degrees of freedom.

Each of the first and second actively-controlled mirrors further include a plurality of voice coil actuator assemblies, where each of the plurality of voice coil actuator assemblies further includes a voice coil actuator, and an interferometric position sensor. The interferometric position sensor outputs a position of the voice coil actuator as a mirror position signal.

Each of the plurality of voice coil actuator assemblies further include a base affixed to the voice coil actuator, and a drive link affixed to an end of the voice coil actuator obverse to the base. Additionally, each assembly includes a plurality of U-shaped flexures positioned circumferentially at equal distances around the drive link, the plurality of U-shaped flexures in physical communication with and between the base and the drive link, the plurality of U-shaped flexures providing transverse stiffness for the drive link. Each assembly also includes a two degree of freedom flexure affixed to an end of the drive link obverse to the voice coil actuator.

The enhanced optical delay line device provides pathlength control, image rotation, beamwalk and tip/tilt control with no induced cross coupling. Each of the first and second actively-controlled mirrors further include three voice coil actuator assemblies.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout:

FIGS. 5A to 5D depicts an enhanced optical delay line device, a mirror assembly, a voice coil actuator assembly, and a closed-loop control system, respectfully, according to one arrangement of the present invention;

DETAILED DESCRIPTION OF THE INVENTION

Figure 1:
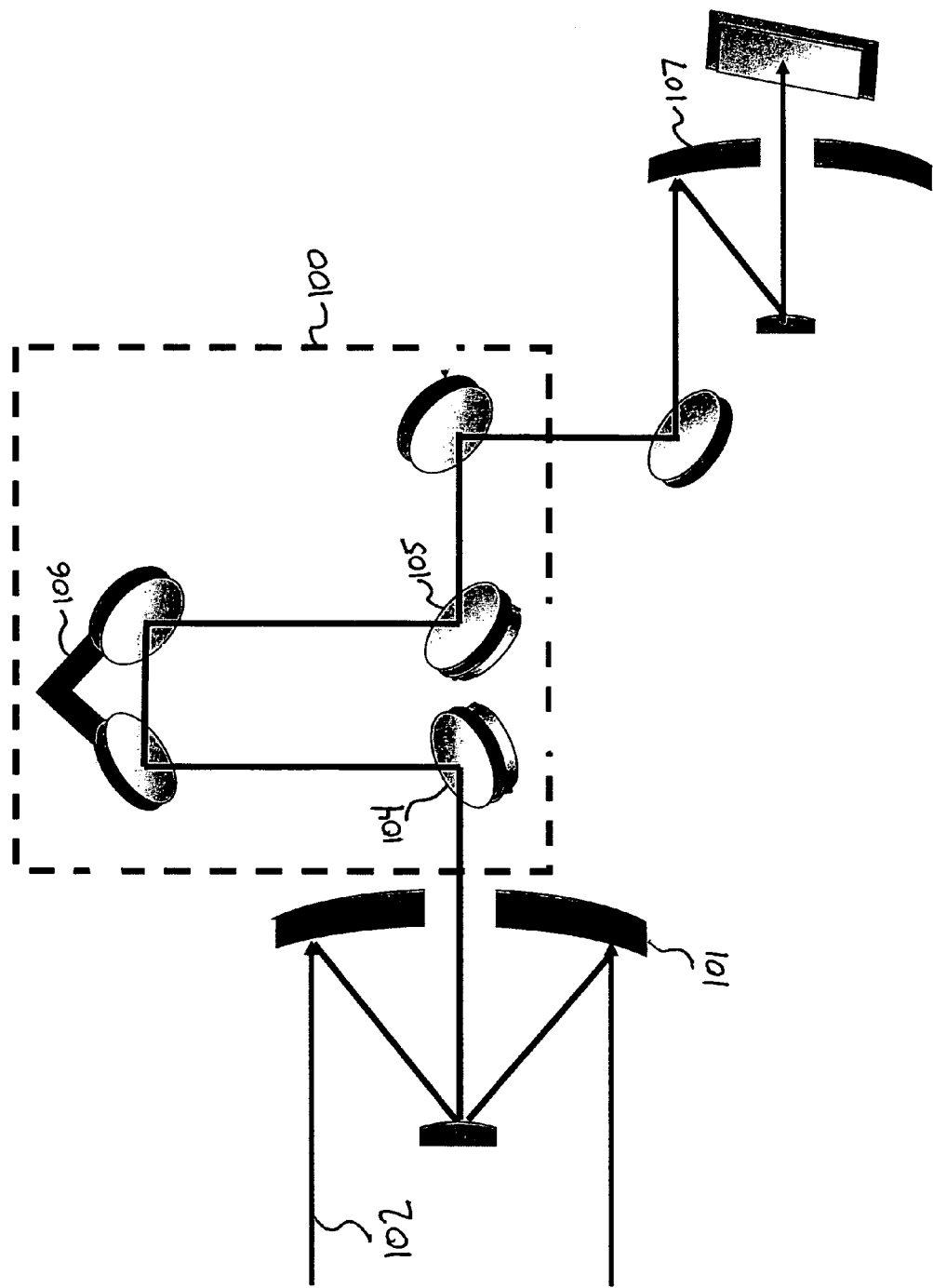
FIG. 1 depicts a relay optics section of a conventional multiple telescope array.
Figure 2:
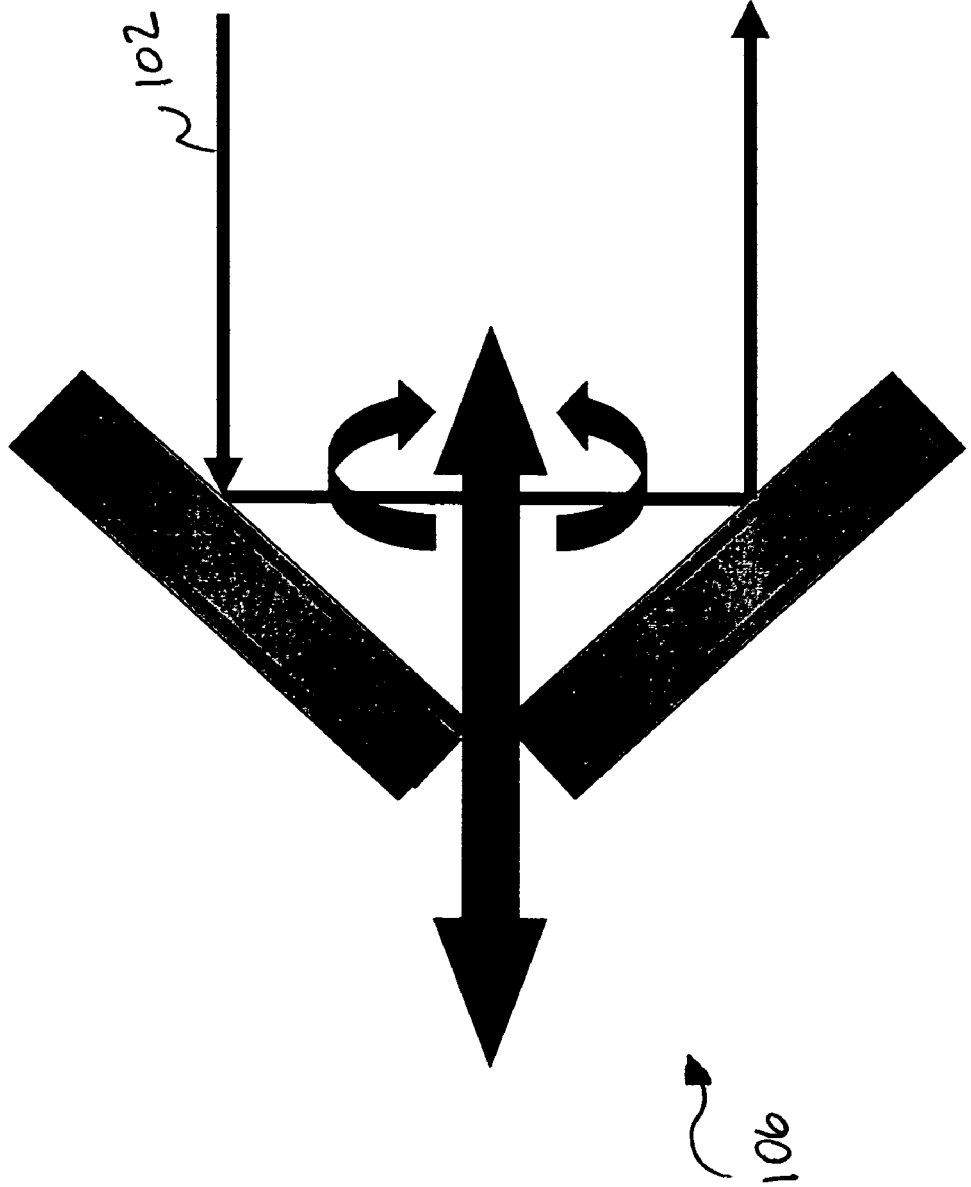
FIG. 2 illustrates the range of motion of a conventional optical delay line device.
Figure 3:
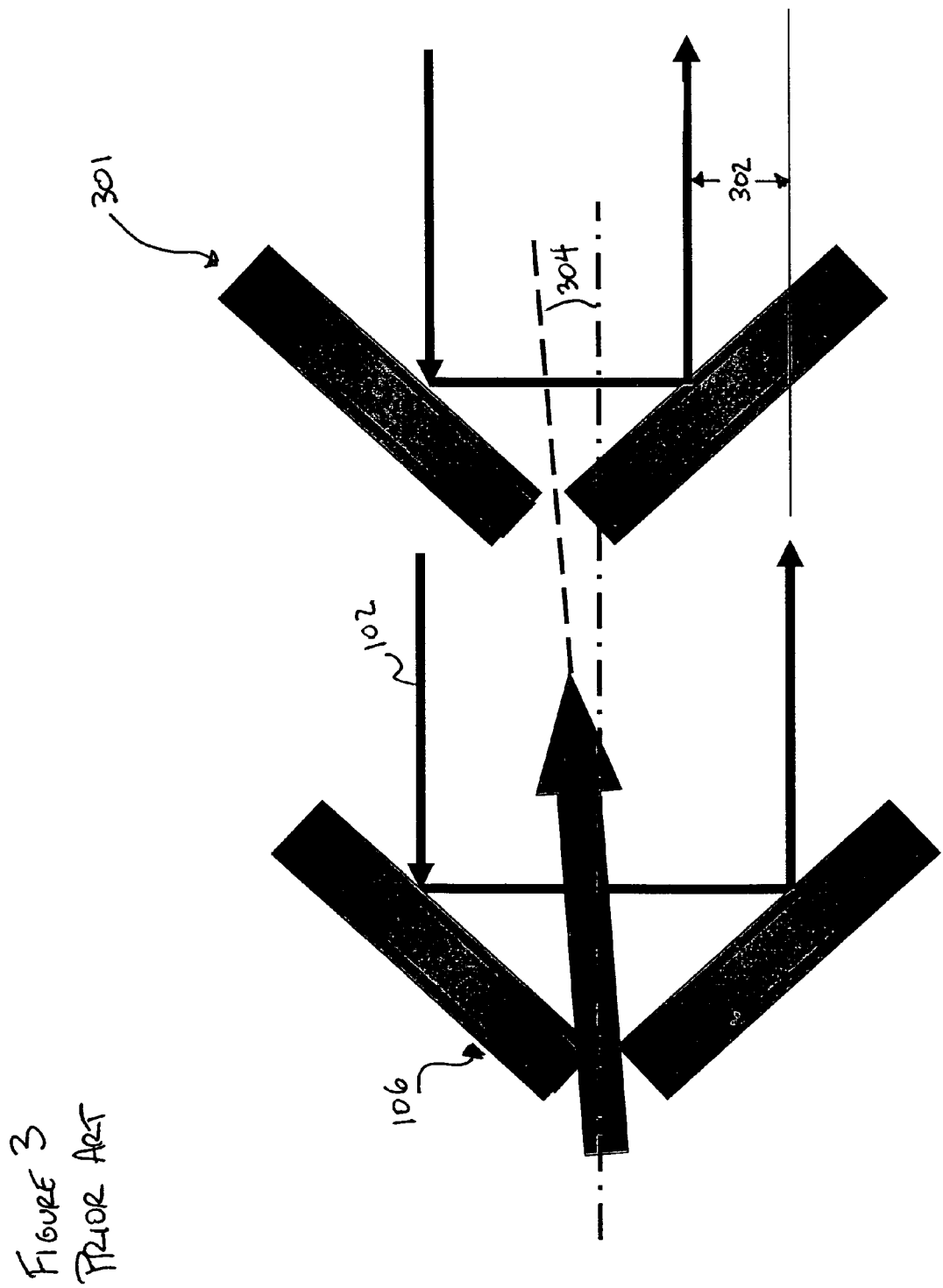
FIG. 3 depicts a misaligned conventional optical delay line device, illustrating the cause of induced beamwalk and tilt error usually encountered in the conventional device.

The present invention provides for improved active optical components which overcome the deficiencies of conventional components. Specifically, the present invention provides enhanced pupil positioning and phase control optics which improve performance by reducing noise and increasing bandwidth, while reducing the weight, power, volume, complexity, difficulty of alignment, and relay optics cost in a multiple aperture telescope system.

FIGS. 5A to 5D depict an enhanced optical delay line device, a mirror assembly, a voice coil actuator assembly, and a closed-loop control system, respectively, according to one arrangement of the present invention. Briefly, the enhanced optical delay line device for providing multiple degree of freedom active control includes first and second actively-controlled mirrors, each of the actively-controlled mirrors having two rotational degrees of freedom and one translational degree of freedom. The first actively-controlled mirror is mounted substantially orthogonally to the second actively-controlled mirror. The system also includes a closed-loop control system, the control system providing six mechanical degrees of freedom of active control for the enhanced optical delay line device by controlling the first and second actively-controlled mirrors based upon a command input and mirror position signals.

In more detail, enhanced optical delay line device 500 for providing multiple degree of freedom active control includes first actively-controlled mirror 501 and second actively-controlled mirror 502, each of first actively-controlled mirror 501 and second actively-controlled mirror 502 having two rotational degrees of freedom and one translational degree of freedom. First actively-controlled mirror 501 is mounted substantially orthogonally to second actively-controlled mirror 502. Enhanced optical delay line device 500 also includes closed-loop control system 504, closed-loop control system 504 providing six mechanical degrees of freedom of active control for enhanced optical delay line device 504 by controlling first actively-controlled mirror 501 and second actively-controlled mirror 502 based upon a command input and mirror position signals.

According to the present invention, problems inherent to conventional optical delay line devices have been solved by developing an actuator mechanism (based on LOCKHEED MARTIN® technology used in FSMs and optical delay lines, known as "trombones") that combines the performance characteristics of both FSMs and trombones.

First actively-controlled mirror 501 and second actively-controlled mirror 502, when driven by closed-loop control system 504, can automatically control six mechanical degrees of freedom, and five of the six optical degrees of freedom of the exit pupil and incoming beam phase. As indicated above, this enhanced level of control was heretofore only possible with a combination of two FSMs and a trombone.

Closed-loop control system 504 uses closed-loop feedback to control the linearity of its output, where the overall behavior of each mirror in the enhanced optical delay line device is inherently non-linear due to the physics of each corresponding actuator.

Figure 5D:
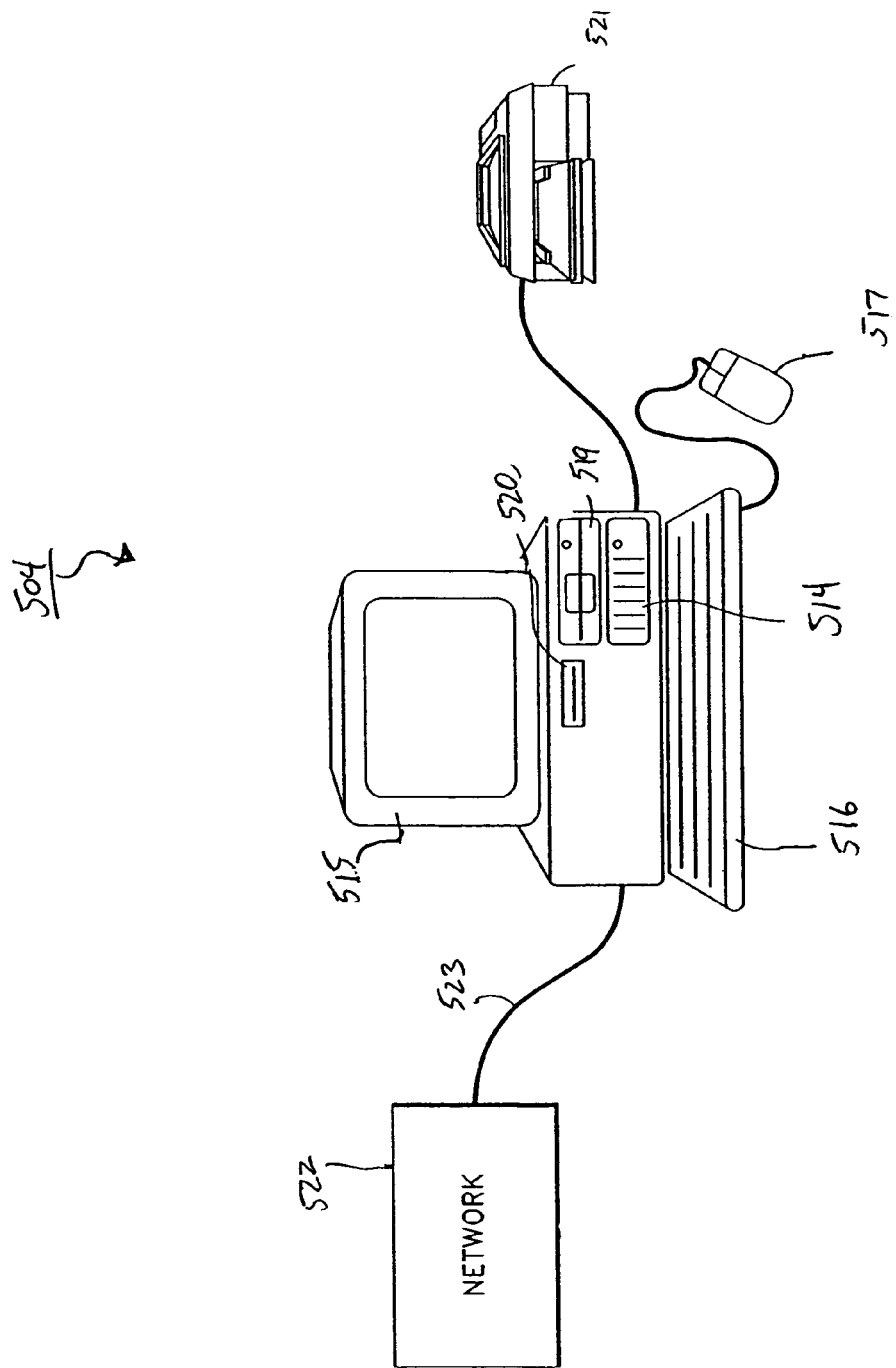

Closed-loop beam closed-loop control system 504 includes computer-readable storage medium, such as fixed disk drive 514, for storing applications which control first actively-controlled mirror 501 and second actively-controlled mirror 502. As shown in FIG. 5D, the hardware environment may include display monitor 515 for displaying text and images to a user, keyboard 516 for entering text data and user commands into closed-loop control system 504, mouse 517 for pointing, selecting and manipulating objects displayed on display monitor 515, fixed disk drive 514, removable disk drive 519, tape drive 520, hardcopy output device 521, computer network 522, and computer network connection 523.

As illustrated in FIGS. 5B and 5C, according to an additional arrangement, each of first actively-controlled mirror 501 and second actively-controlled mirror 502 further include a plurality of voice coil actuator assemblies, such as voice coil actuator assemblies 505 to 507. The configuration and operation of voice coil actuator assemblies 505 to 507 is described more fully below, with reference to FIG. 9.

Figure 6:
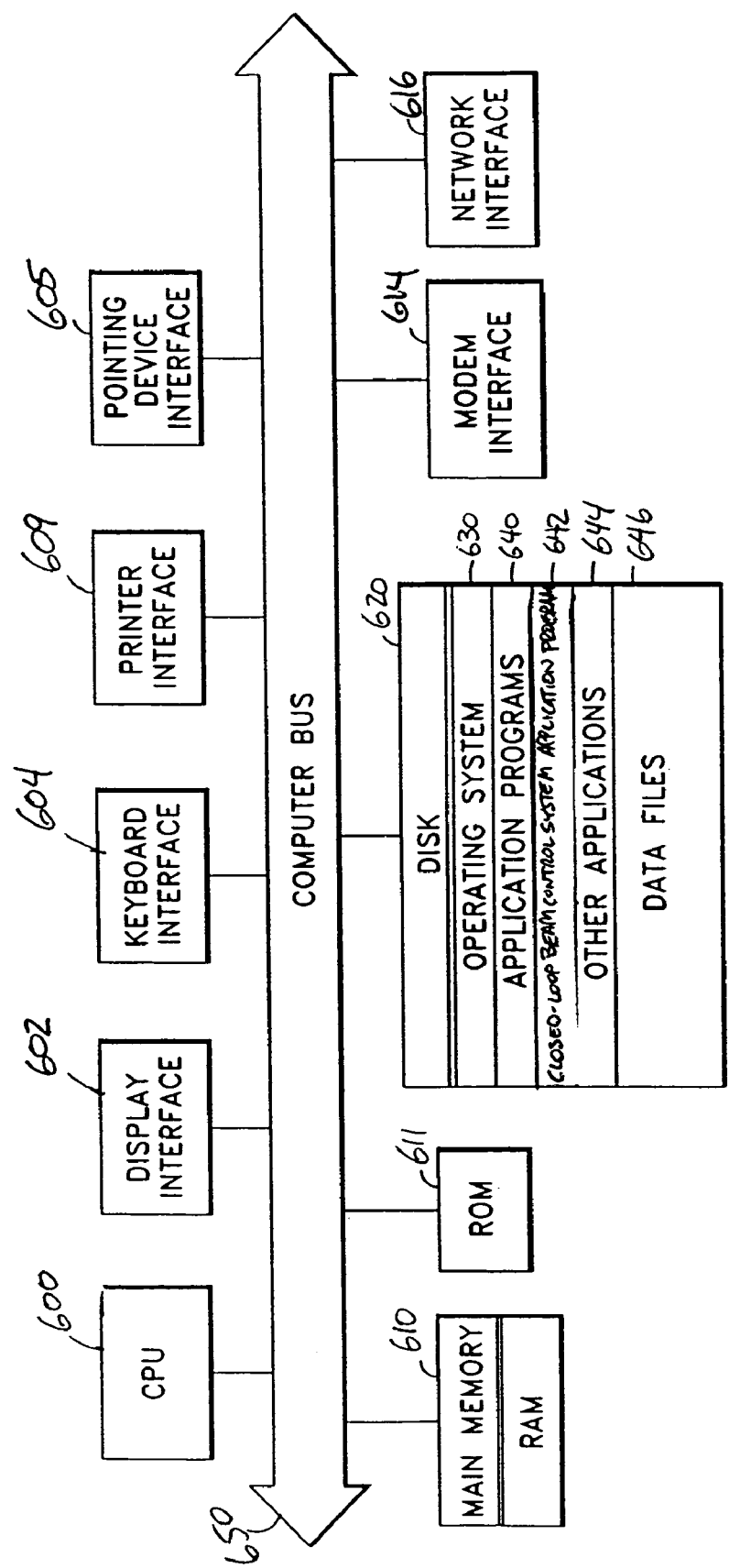
FIG. 6 is a detailed block diagram showing the internal architecture of the closed-loop control system according to one arrangement of the present invention.

FIG. 6 is a detailed block diagram showing the internal architecture of closed-loop control system 504. As shown in FIG. 6, the computing environment includes central processing unit ("CPU") 600 where the computer instructions that comprise an operating system or an application, including the closed-loop control system application programs 642, are processed; display interface 602 which provides communication interface and processing functions for rendering graphics, images, and text on display monitor 515; keyboard interface 604 which provides a communication interface to keyboard 516; pointing device interface 605 which provides a communication interface to mouse 517 or an equivalent pointing device; printer interface 609 which provides a communication interface to hardcopy output device 521; random access memory ("RAM") 610 where computer instructions and data can be stored in a volatile memory device for processing by CPU 600; read-only memory ("ROM") 611 where invariant low-level systems code or data for basic system functions such as basic input and output (I/O), startup, or reception of keystrokes from keyboard 516 are stored in a non-volatile memory device; disk 620 which can comprise fixed disk drive 514 and removable disk drive 519, where the files that comprise operating system 630, application programs 640 (including closed-loop control system application programs 642 and other applications 644) and data files 646 are stored; modem interface 614 which provides a communication interface to computer network 522 over a modem connection; and computer network interface 616 which provides a communication interface to computer network 522 over computer network connection 523. The constituent devices and CPU 600 communicate with each other over computer bus 650.

The closed-loop control of enhanced optical delay line device 500 is preferably implemented as shown, however it is also possible to implement the closed-loop control system according to the present invention as a dynamic link library ("DLL"), or as a plug-in to other application programs.

Figure 4:
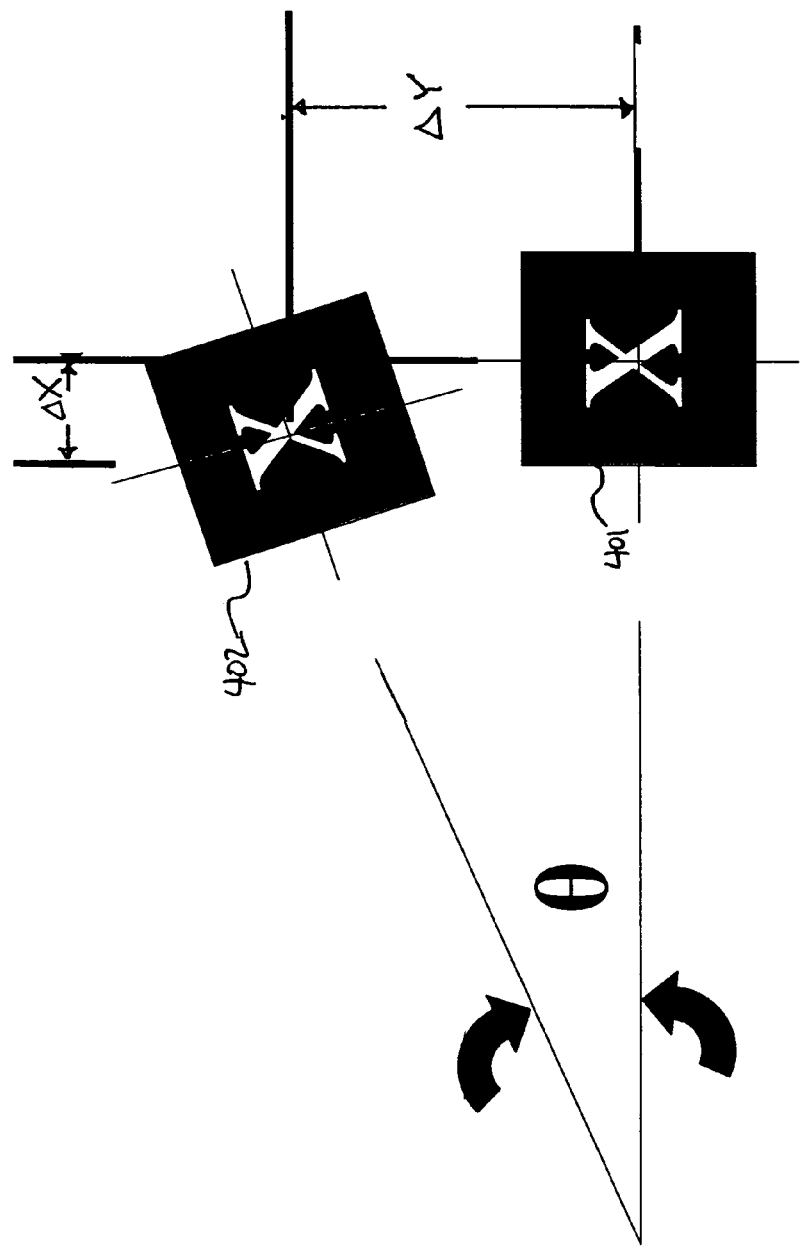
FIG. 4 depicts the beamwalk induced when a conventional optical delay line device rotates the beam.

Although FIGS. 4 to 6 illustrate a preferred embodiment of a closed-loop control system that executes program code, or program or process steps, other types of closed-loop control systems may also be used as well. In particular, although closed-loop control system 504 has been described as a desktop PC, in further arrangements of the present invention closed-loop control system 504 is a laptop, a workstation or an embedded system.

Figure 7:
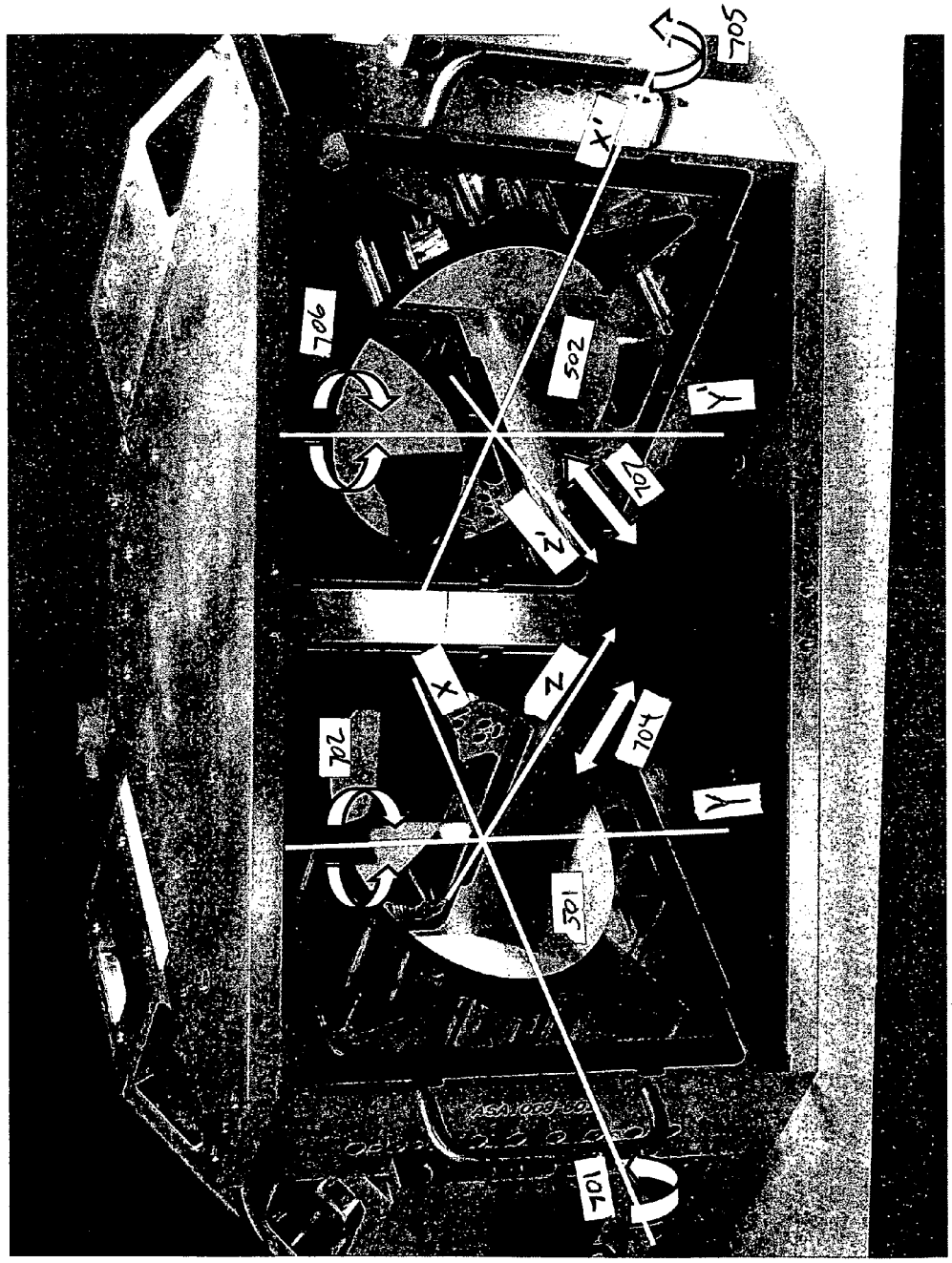
FIG. 7 depicts the first and second actively-controlled mirrors and, in particular, illustrates the two rotational degrees of freedom and one translational degree of freedom for each mirror.

FIG. 7 depicts the first and second actively-controlled mirrors and, in particular, illustrates the two rotational degrees of freedom and one translational degree of freedom provided by each mirror. In more detail, first actively-controlled mirror 501 is mounted substantially orthogonally to second actively-controlled mirror 502, where each mirror is illustrated with its own three-dimensional set of axis, labeled X-Y-Z and X'-Y'-Z', respectively. The origin of each set of axes is disposed at the center of the mirror.

X-axis and Z-axis of first actively-controlled mirror 501, and X'-axis and Z'-axis of second actively-controlled mirror 502, intersect at substantially a 90° angle, respectively. Y-axis and Y'-axis are substantially parallel.

First actively-controlled mirror 501 has a rotational degree of freedom rotating around the X-axis (denoted by arrows 701), a rotational degree of freedom rotating around the Y-axis (denoted by arrows 702), and a translational degree of freedom along the Z-axis (denoted by arrows 704). Similarly, second actively-controlled mirror 502 has a rotational degree of freedom rotating around the X'-axis (denoted by arrows 705), a rotational degree of freedom rotating around the Y'-axis (denoted by arrows 706), and a translational degree of freedom along the Z'-axis (denoted by arrows 707). As such, each actively-controlled mirror has at least three degrees of freedom.

Figure 8:
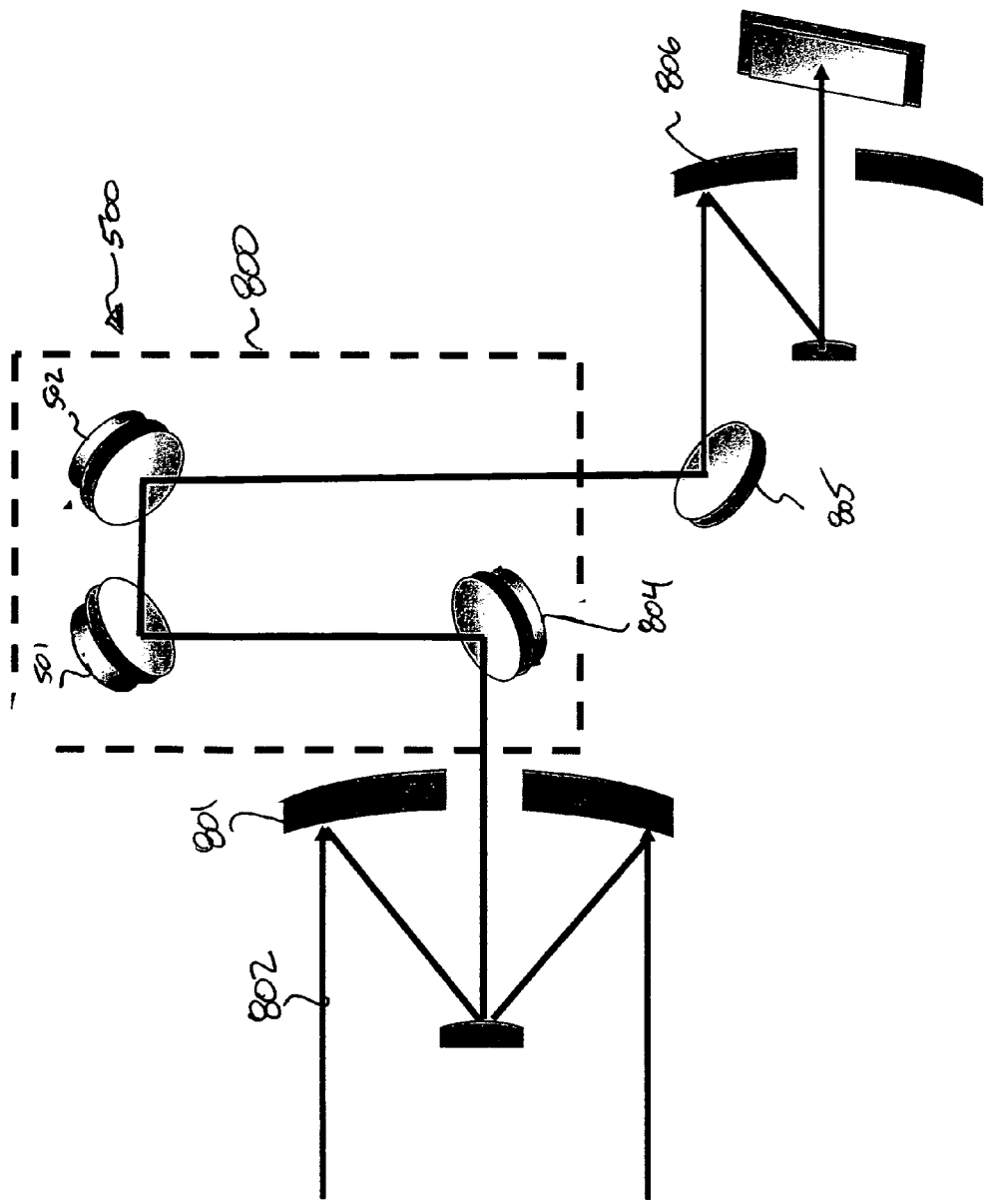
FIG. 8 depicts the FIG. 1 enhanced optical delay line device, used in a multiple aperture telescope optical system.

FIG. 8 depicts the FIG. 1 enhanced optical delay line device, used in a multiple aperture telescope optical system. The active optical components used in relay optics section 800 of the multiple telescope array precisely control the position and orientation of the exit pupil of collector telescope 801, as well as the phase of incoming beam 802.

The enhanced optical delay line device according to the present invention is smaller than the conventional optical delay line designs, has better performance, and eliminates the need for one of the FSMs, bringing the total number of active optical mechanisms down to two from three. While this reduction in weight, power, volume, complexity, difficulty of alignment, and cost may be modest for one optical path, since a multiple telescope array may have anywhere from three to nine optical paths, the savings are substantial.

Figure 9B:
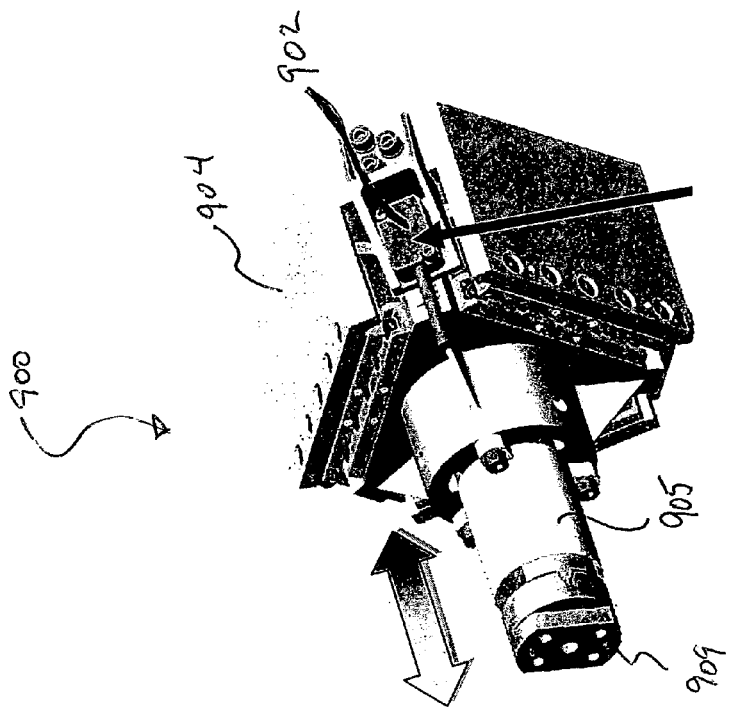
FIGS. 9A and 9B depict first and second actively-controlled mirrors, in accordance with an additional arrangement of the present invention.
Figure 9A:
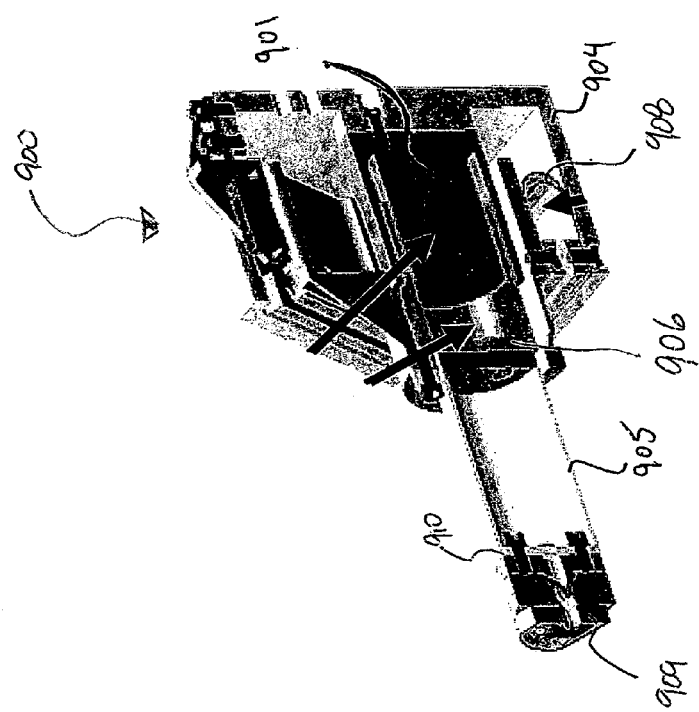

FIGS. 9A and 9B depict first and second actively-controlled mirrors, in accordance with an additional arrangement of the present invention. In more detail, first actively-controlled mirror 501 and second actively-controlled mirror 502 each further include a plurality of voice coil actuator assemblies 900, where each of the plurality of voice coil actuator assemblies 900 further includes a voice coil actuator, such as voice coil actuator 901, and interferometric position sensor 902, position sensor 902 outputting a position of voice coil actuator 901 as a mirror position signal.

Voice coil actuator assembly 900 further includes base 904 affixed to voice coil actuator 901, and drive link 905 affixed to end 906 of voice coil actuator 901 obverse to base 904. Additionally, enhanced optical delay lined device 500 includes a plurality of U-shaped flexures, including U-shaped flexure 908, positioned circumferentially at equal distances around drive link 905, the plurality of U-shaped flexures in physical communication with and between base 904 and drive link 905, the plurality of U-shaped flexures providing transverse stiffness for drive link 905. Enhanced optical delay lined device 500 also includes two degree of freedom flexure 909 affixed to end 910 of drive link 905 obverse to voice coil actuator 901.

The two rotational degrees of freedom and one translational degree of freedom effectuated by each of the actively-controlled mirrors is caused by individually manipulating the command voltages provided to each of the voice coil actuators provided for each mirror. In one arrangement, for example, an actively-controlled mirror includes three voice coil actuator assemblies positioned circumferentially at substantially equal distances around the drive link.

If the same command voltage is provided to each of the three voice coil actuators, the mirror will effectuate a translational motion, since each voice coil actuator is moving the same distance. On the other hand, if one or two of the voice coil actuators were provided with a command voltage which differs from the command voltage of the third voice coil actuator, the associated mirror would be controlled through one or two rotational degrees of freedom. Depending on the individual design requirements for the optical delay line device, fewer or more voice coil actuators may be utilized, and the voice coil actuators can be disposed at uneven distances on the non-reflective side of each mirror.

Accordingly, the present invention is able to simultaneously improve performance by reducing noise and increasing bandwidth, while reducing the weight, power, volume, complexity, difficulty of alignment, and cost of the relay optics in a multiple aperture telescope system.

FIGS. 10A to 10D illustrate the principles of operation of the conventional optical delay line device as well as the enhanced optical delay line device, according to one arrangement of the present invention. As indicated above, enhanced optical delay line device 500 provides pathlength control, and/or image rotation with no induced beamwalk.

Figure 10C:
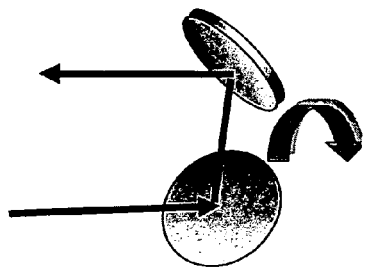
FIGS. 10A to 10D illustrate the principles of operation of the conventional optical delay line device as well as the enhanced optical delay line device, according to one arrangement of the present invention.
Figure 10D:
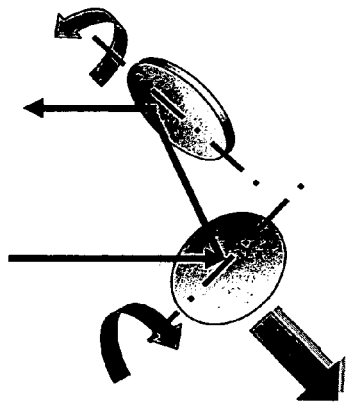
Figure 10A:
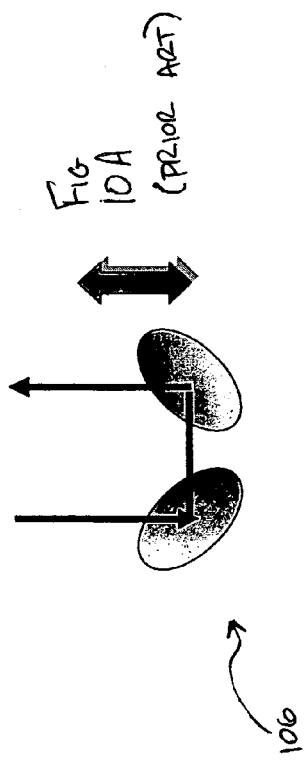

FIG. 10A illustrates pathlength control with conventional two degree of freedom optical delay line device 106. Specifically, conventional optical delay line device 106 as a whole provides a single translational mechanical motion of distance X, as indicated by the arrows, and the pathlength change effectuated is distance 2X.

Figure 10B:
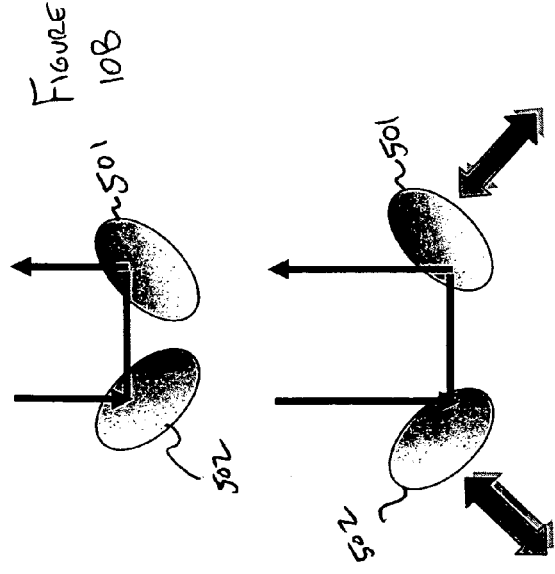

FIG. 10B illustrates pathlength control using enhanced optical delay line device 500 as a multiple degree of freedom optical delay line device. As indicated by the arrows, each actively-controlled mirror effectuates a translational mechanical motion over distance Z. As a result, the pathlength changes over a distance of $2Z\sqrt{2}$, with no induced beamwalk. As indicated above, the translational motion can be effectuated by providing all of the a mirror's corresponding voice coil actuators with the same command voltage.

FIG. 10C illustrates image rotation control with two degree of freedom conventional optical delay line device 106. Specifically, conventional optical delay line device 106 as a whole provides a single rotational motion. The problems associated with this approach are outlined above, with reference to FIG. 4.

FIG. 10D illustrates image rotation control using enhanced optical delay line device 500 as a six degree of freedom optical delay line device. As indicated by the arrows, each actively-controlled mirror effectuates a translational mechanical motion plus a rotational motion, resulting in enhanced image rotation with no induced beamwalk.

Figure 11:
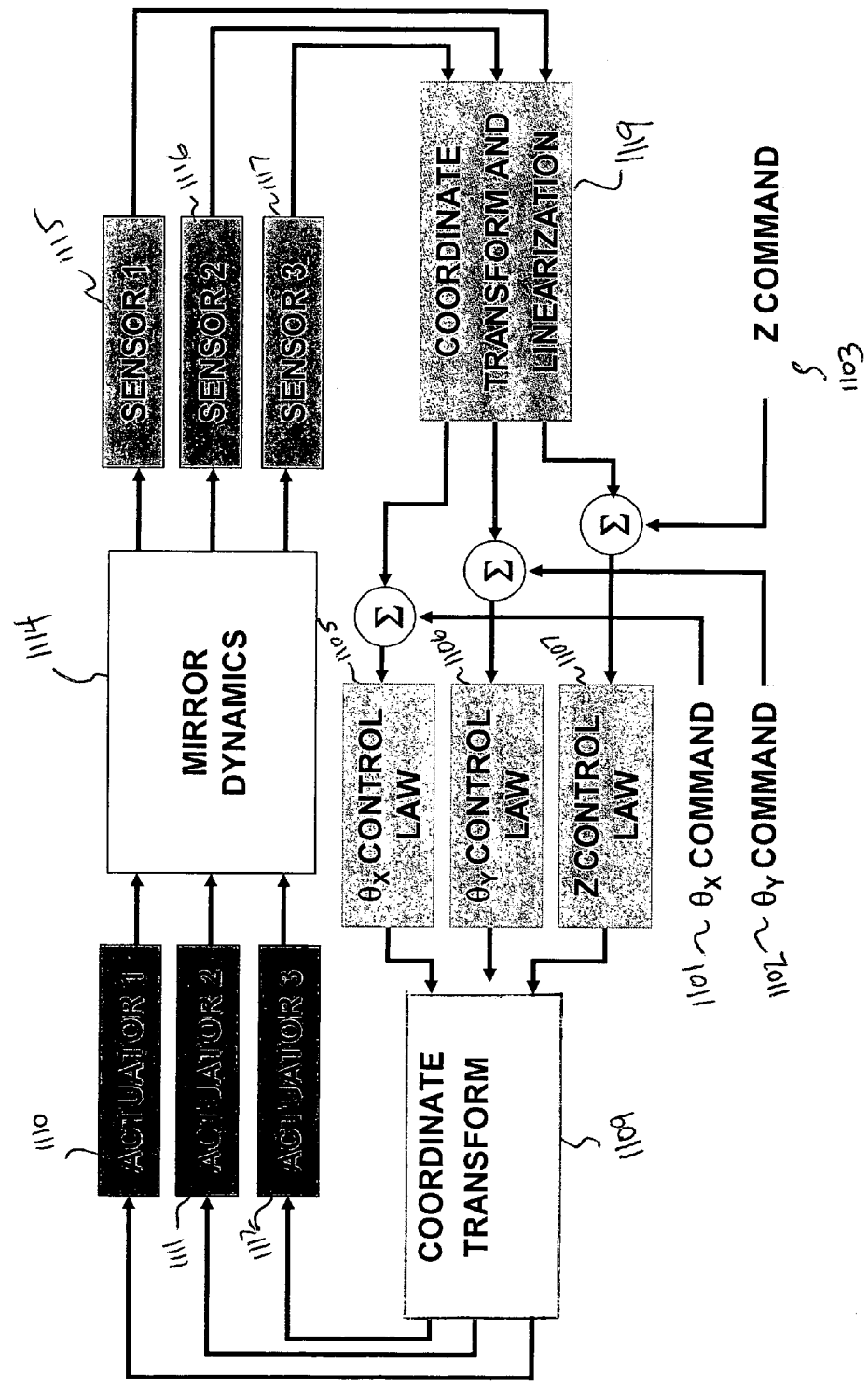
FIG. 11 illustrates a local control loop block diagram for each optical delay line mirror in the enhanced optical delay line device.

FIG. 11 illustrates the local control loop block diagram for each optical delay line mirror in enhanced optical delay line device 500. A command input, comprising $\theta_x$ command component 1101, $\theta_y$ command component 1102, and z command component 1103, is input into closed-loop control system 504 by a beam control system. $\theta_x$ control law 1105, $\theta_y$ control law 1106, and z control law 1107 are applied to the corresponding command components to determine desired voice coil actuator positioning, and coordinate transform 1109 determines the voltages needed to be transmitted to the plurality of actuators, to correctly position each mirror through two rotational degrees of freedom and one translational degree of freedom. These voltages are applied to the plurality of actuators, which comprise actuators 1110 to 1112 in FIG. 11, and first actively-controlled mirror 501 and second actively-controlled mirror 502 are mechanically positioned (at reference 1114).

Interferometric position sensors 1115 to 1117, representing interferometric position sensor 902 for example, measure the actual position of the voice coil actuators, and transmit these measured positions as mirror position signals to closed-loop control system 504. A coordinate transform and linearization is performed (at reference 1119), in order to remove unwanted non-linearities and transform the actuator measurements into two angles and a displacement. As shown in FIG. 11, the difference $X_{out}$ between each commanded actuator position (references 1101 to 1103) and the actual actuator position is added to each of $\theta_x$ command component 1101, $\theta_y$ command component 1102, or z command component 1103, and the resulting values are input into closed-loop control system 504, as described above.

In this manner, a closed-loop control system is formed, and measured voice coil actuator positions are compared with the command input in a continuous fashion, in order to compensate for actuator and mechanism non-linearities. On each iteration of the closed control loop, closed-loop control system 504 zeroes out the difference between commanded actuator positions and actual actuator positions.

Figure 12:
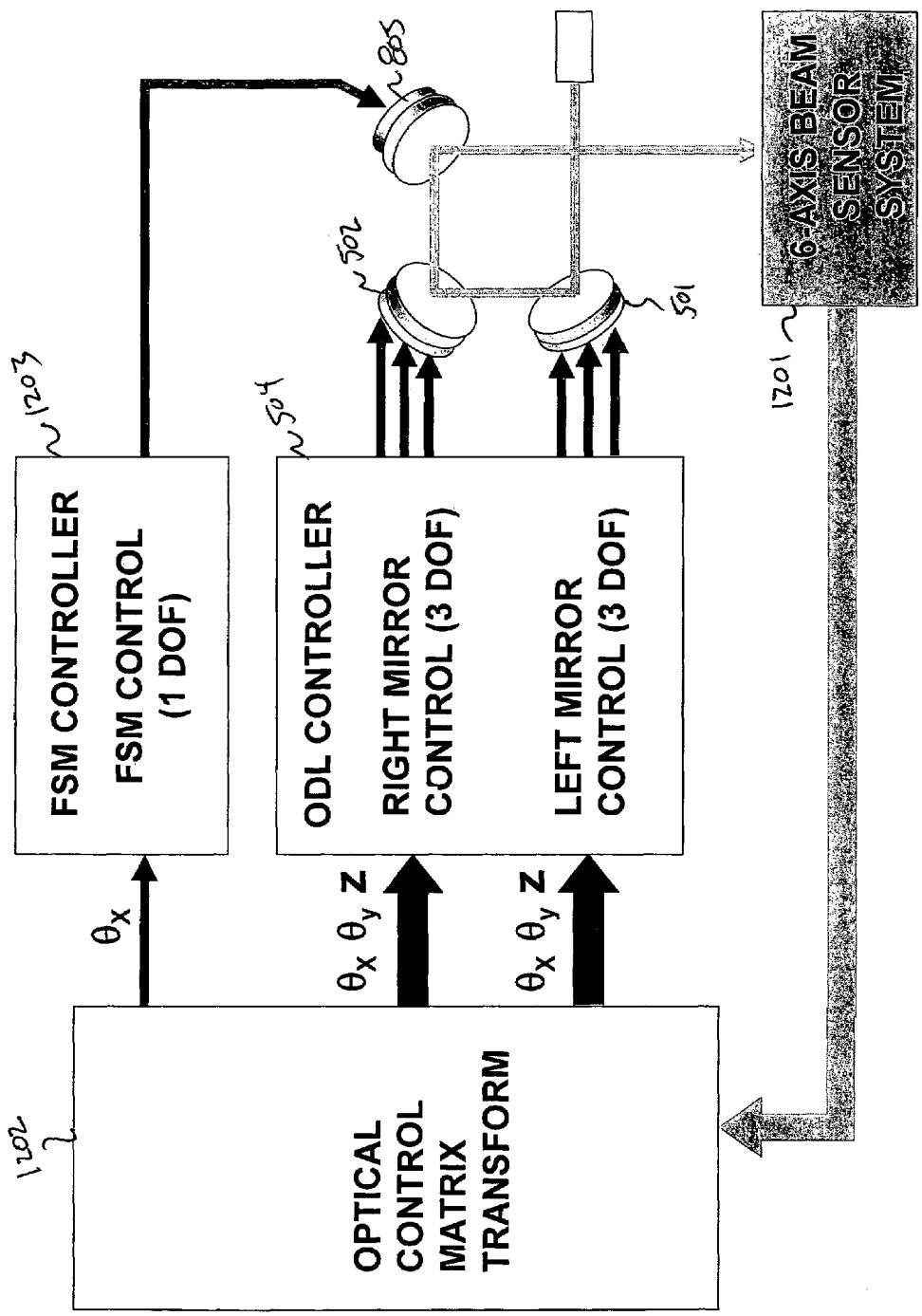
FIG. 12 illustrates a beam state control block diagram for relay optics using six degree of freedom metrology.

FIG. 12 illustrates a beam state control block diagram for relay optics using six degree of freedom metrology. Based upon the detected position and orientation of a beam which is exiting the enhanced optical delay line device, a six-axis beam sensor system 1201 inputs desired pathlength, rotation, tilt X, tilt Y, walk X and walk Y measurements into optical control matrix transform 1202. FSM controller 1203 receives a $\theta_x$ command component from optical control matrix transform 1202, for controlling one degree of freedom. Closed-loop control system 504 receives a $\theta_x$ command component, a $\theta_y$ command component, and a z command component for each of first actively-controlled mirror 501 and second actively-controlled mirror 502, where each command input is converted into a voltage applied to the respective voice coil actuators according to the block diagram depicted in FIG. 11.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. An enhanced optical delay line device for providing multiple degree of freedom active control, comprising:
    first and second actively-controlled mirrors, each of said actively-controlled mirrors having two rotational degrees of freedom and one translational degree of freedom, said first actively-controlled mirror mounted substantially orthogonally to said second actively-controlled mirror; and
    a closed-loop control system, said control system providing six mechanical degrees of freedom of active control for the enhanced optical delay line device by controlling said first and second actively-controlled mirrors based upon a command input and mirror position signals.

2. The enhanced optical delay line device according to claim 1, wherein each of said first and second actively-controlled mirrors further comprise:
    a plurality of voice coil actuator assemblies, wherein each of said plurality of voice coil actuator assemblies further comprises a voice coil actuator, and an interferometric position sensor, said interferometric position sensor outputting a position of said voice coil actuator as a mirror position signal.

3. The enhanced optical delay line device according to claim 2, wherein each of said plurality of voice coil actuator assemblies further comprise:
    a base affixed to said voice coil actuator;
    a drive link affixed to an end of said voice coil actuator obverse to said base;
    a plurality of U-shaped flexures positioned circumferentially at equal distances around said drive link, said plurality of U-shaped flexures in physical communication with and between said base and said drive link, said plurality of U-shaped flexures providing transverse stiffness for said drive link; and a two degree of freedom flexure affixed to an end of said drive link obverse to said voice coil actuator.

4. The enhanced optical delay line device according to claim 1, wherein the enhanced optical delay line device provides pathlength control.

5. The enhanced optical delay line device according to claim 1, wherein the enhanced optical delay line device provides image rotation with no induced beamwalk.

6. The enhanced optical delay line device according to claim 1, wherein said first and second actively-controlled mirrors provide tip and/or tilt control.

7. The enhanced optical delay line device according to claim 1, wherein said first and second actively-controlled mirrors provide phase control.

8. The enhanced optical delay line device according to claim 2, wherein each of said actively-controlled mirrors further comprise three voice coil actuator assemblies.

9. The enhanced optical delay line device according to claim 3, wherein each of said plurality of voice coil actuator assemblies further comprise three U-shaped flexures.

10. The enhanced optical delay line device according to claim 1, wherein the enhanced optical delay line device provides pathlength control, image rotation, beamwalk and tip/tilt control with no induced cross coupling.

11. The enhanced optical delay line device according to claim 1, wherein said closed-loop control system provides five optical degrees of freedom of active control.

12. The enhanced optical delay line device according to claim 1, wherein each of said first and second actively-controlled mirrors are elliptical.

13. The enhanced optical delay line device according to claim 3, wherein each of the plurality of U-shaped flexures are multi-layer U-shaped flexures.

* * * * *